US007514829B2

(12) United States Patent
Otsuji et al.

(10) Patent No.: US 7,514,829 B2
(45) Date of Patent: Apr. 7, 2009

(54) BUSBAR UNIT FOR AN ELECTRIC MOTOR

(75) Inventors: Motofumi Otsuji, Kyoto (JP); Nakaba Kataoka, Kyoto (JP)

(73) Assignee: Nidec Corporation, Kyoto (JP)

( * ) Notice: Subject to any disclaimer, the term of this patent is extended or adjusted under 35 U.S.C. 154(b) by 0 days.

(21) Appl. No.: 12/060,373

(22) Filed: Apr. 1, 2008

(65) Prior Publication Data

US 2008/0242124 A1 Oct. 2, 2008

(30) Foreign Application Priority Data

Apr. 2, 2007 (JP) ............................ 2007-096027

(51) Int. Cl.
*H02K 11/00* (2006.01)

(52) U.S. Cl. ........................................................ 310/71

(58) Field of Classification Search ................... 310/71, 310/180; *H02K 003/50, 003/52, 003/18*
See application file for complete search history.

(56) References Cited

U.S. PATENT DOCUMENTS 6,707,185 B2 * 3/2004 Akutsu et al. ................. 310/71
6,914,356 B2 7/2005 Yamamura et al.
6,993,829 B2 * 2/2006 Kobayashi et al. ............ 29/622

FOREIGN PATENT DOCUMENTS

JP 3800371 B2 7/2006

* cited by examiner

*Primary Examiner*—Javaid Nasri
(74) *Attorney, Agent, or Firm*—Keating & Bennett, LLP

(57) ABSTRACT

A busbar unit includes a busbar holder and a plurality of busbars. The busbar holder has a first surface and a second surface on both sides in an axial direction, respectively. The first surface is provided with grooves in which one or more busbars are accommodated. The busbar in the groove of the first surface is provided with a wire connector portion on the first surface. The second surface is also provided with grooves accommodating remaining busbar(s) therein. The busbar(s) in the groove of the second surface is provided with a wire connector portion on the second surface. To each wire connector portion, a conductive wire forming a coil winding of an armature of a motor is connected.

13 Claims, 12 Drawing Sheets

BUSBAR UNIT FOR AN ELECTRIC MOTOR

BACKGROUND OF THE INVENTION

1. Field of the Invention

The present invention relates to a structure of a busbar unit which supplies current to an armature of a motor.

2. Description of the Related Art

An armature of a brushless motor includes a core back portion, a plurality of teeth radially extending from the core back portion, and coil windings formed by winding a conductive wire around each tooth. A rotor of the brushless motor is rotated when a driving current is supplied to the coil windings. A busbar unit for supplying the current from a power supply to the respective coil winding is provided in a housing of the brushless motor.

The busbar unit includes a plurality of busbars to which wiring from the power supply, and ends of the conductive wires forming the coil windings, are connected. With this configuration, the coil windings of the armature and the power supply are electrically connected to each other.

In general, the busbar unit is circular in plan view and has surfaces on both sides. The busbar unit is arranged coaxially with the armature so that they are axially opposed to each other. The busbar unit is connected at wire connector portions thereof to the conductive wires forming the coil windings.

In an exemplary known busbar unit, a number of busbars are arranged annularly and a plurality of wire connector portions extend therefrom. The wire connector portions are arranged on one of the surfaces of the busbar unit.

In another exemplary known busbar unit, a plurality of grooves are provided on one of the surfaces and busbars are arranged in the grooves. Each groove has a communication hole which runs through the busbar unit to the other surface. A portion of each busbar projects through the communication hole from the other surface. This projecting portion forms a wire connector portion.

As described above, it is necessary to connect ends of the conductive wires forming the coil windings to the wire connector portions in the busbar unit. This connection work is usually done manually.

In the aforementioned known busbar units, however, the wire connector portions are arranged on only one of the surfaces of the busbar unit. Thus, a distance between adjacent wire connector portions is too small to respectively connect the conductive wires to the wire connector portions. Especially in a motor having many slots, the number of coil windings is large because the number of coil windings corresponds to the number of slots. Therefore, the distance between the adjacent wire connector portions is very small, making the connection work difficult.

SUMMARY OF THE INVENTION

In order to overcome the problems described above, preferred embodiments of the present invention provide a busbar unit for use in a motor. The busbar unit preferably includes a plurality of busbars having a plurality of wire connector portions to which ends of conductive wires extending from coil windings of an armature of the motor are connected, and a busbar holder arranged axially above the armature. The busbar holder is preferably made of an insulating material, and is arranged to support the busbars. The wire connector portions are preferably arranged on both surfaces of the busbar holder.

This configuration enables easy connection of the conductive wires forming the coil windings and the wire connector portions of the busbars to each other.

Other features, elements, advantages and characteristics of the present invention will become more apparent from the following detailed description of preferred embodiments thereof with reference to the attached drawings.

DETAILED DESCRIPTION OF PREFERRED EMBODIMENTS

Figure 1:
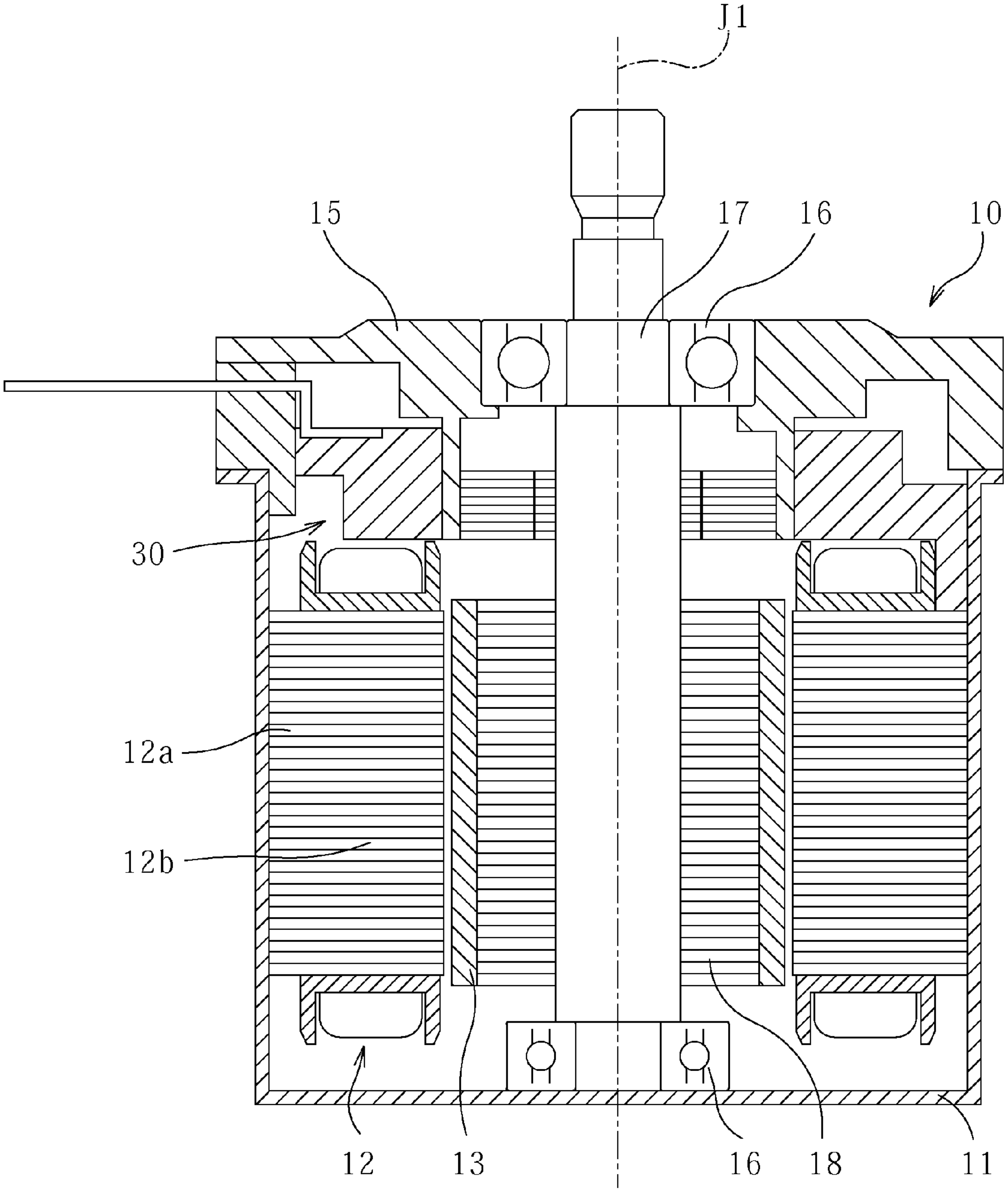
FIG. 1 is a cross-sectional view of a brushless motor according to a first preferred embodiment of the present invention.

Referring to FIGS. 1 through 12, preferred embodiments of the present invention will be described in detail. It should be noted that in the explanation of the preferred embodiments of the present invention, when positional relationships among and orientations of the different components are described as being up/down or left/right, ultimately positional relationships and orientations that are in the drawings are indicated; positional relationships among and orientations of the components once having been assembled into an actual device are not indicated. Meanwhile, in the following description, an axial direction indicates a direction substantially parallel to a center axis, and a radial direction indicates a direction substantially perpendicular to the center axis.

First Preferred Embodiment

A first preferred embodiment of the present invention will now be described referring to the drawings. FIG. 1 is a cross-sectional view of a brushless motor 10 with a busbar unit 30 attached thereto according to the present preferred embodiment. The brushless motor 10 may be arranged in various orientations depending on a state where it is attached, and therefore any portion thereof may be located on the top. However, in the following description, it is assumed that “up” and “down” in FIG. 1 are the same as those of the brushless motor 10 and the busbar unit 30 for the sake of convenience.

The brushless motor 10 of the present preferred embodiment is preferably used as a motor which assists a driver of a vehicle, for example. In that case, the brushless motor 10 operates and rotates by using a current supplied from a vehicle's battery and is used, for example, as a motor for an electric power steering device which assists a driver in steering the vehicle.

The brushless motor 10 preferably includes a hollow housing 11, an armature 12, and a rotor magnet 13. The housing 11 is arranged approximately cylindrically about a center axis J1 of the brushless motor 10 in the present preferred embodiment, and accommodates the armature 12 and the rotor magnet 13 therein. The housing 11 is open at an upper axial end. A bracket 15 is attached to the open end of the housing 11. A ball bearing 16 is provided in a center opening of the bracket 15. Another ball bearing 16 is provided at a center of the bottom of the housing 11. The ball bearings 16 and 16 support a shaft 17 which is coaxial with the center axis J1 so that the shaft 17 can rotate freely.

The armature 12 includes a core back portion 12*a*, a plurality of teeth 12*b*, and a plurality of coil windings. The core back portion 12*a* is secured to an inner side surface of the housing 11 and is arranged substantially annularly about the center axis J1. The teeth 12*b* are arranged radially and extend from the core back portion 12*a* toward the center axis J1. Coil windings are formed by winding a conductive wire around each tooth 12*b*. The rotor magnet 13 is secured to an outer side surface of a yoke 18 which is secured to the shaft 17, and rotates about the center axis J1 together with the shaft 17.

The busbar unit 30 is arranged above the armature 12. The busbar unit 30 is electrically connected to the coil windings of the armature 12.

In the present preferred embodiment, a segmented core structure is preferably used in the armature 12, in which a plurality of segmented cores each having one tooth 12*b* are joined to each another to form the armature 12. When forming the coil windings, a conductive wire is wound around each tooth 12*b* before the segmented cores are joined to each other. Thus, it is easier to wind the conductive wires around the teeth 12*b* in the present preferred embodiment. The improvement of operability of the winding operation also improves the lamination factor of the coil windings.

In the brushless motor 10 thus assembled which is an inner rotor type, a control unit (not shown) controls a current supply to the armature 12 in accordance with a rotational position of the rotor magnet 13 so that the current is supplied to predetermined coil windings of the armature 12. When the current is supplied, a magnet pole of the coil winding is changed, whereby the rotor magnet 13 is rotated. In this manner, the brushless motor 10 is provided a driving force.

Figure 2:
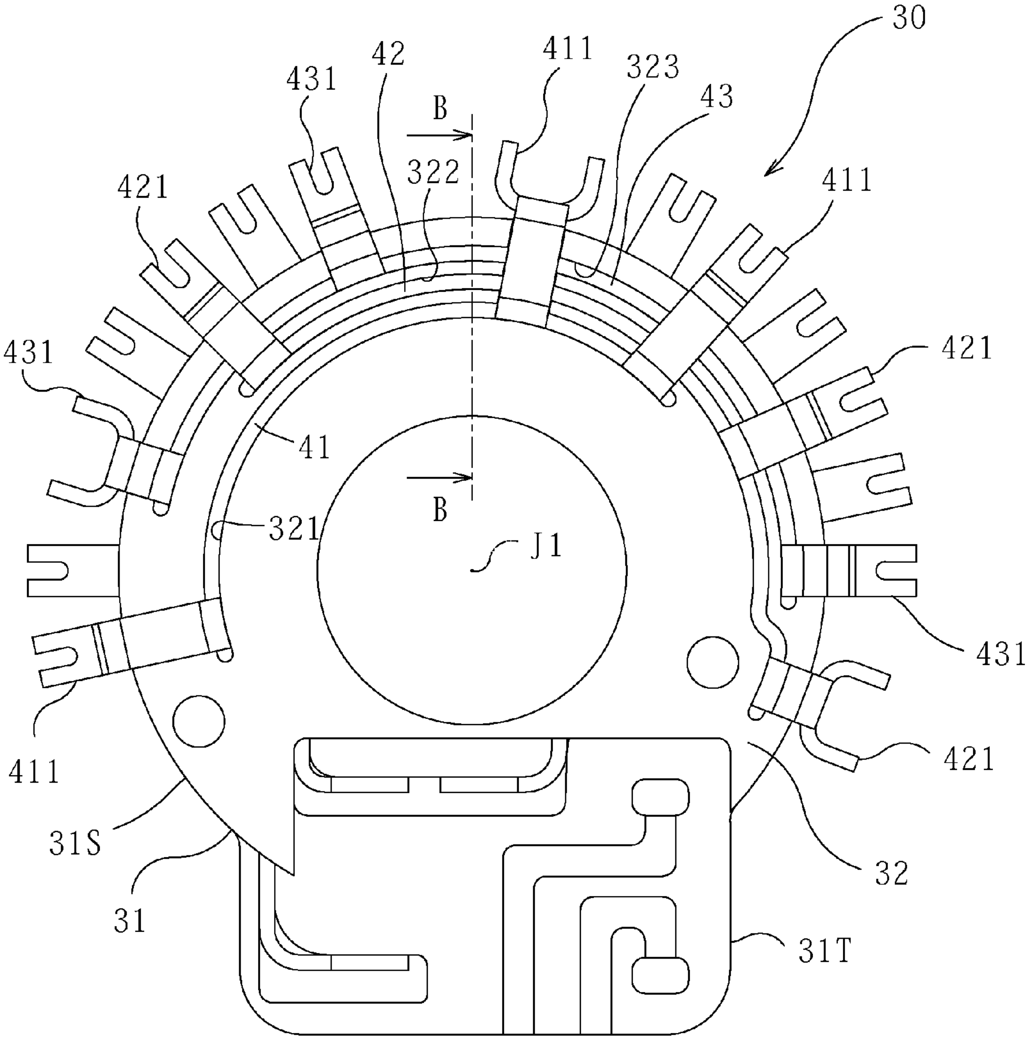
FIG. 2 is a bottom view of a busbar unit according to the first preferred embodiment of the present invention.
Figure 3:
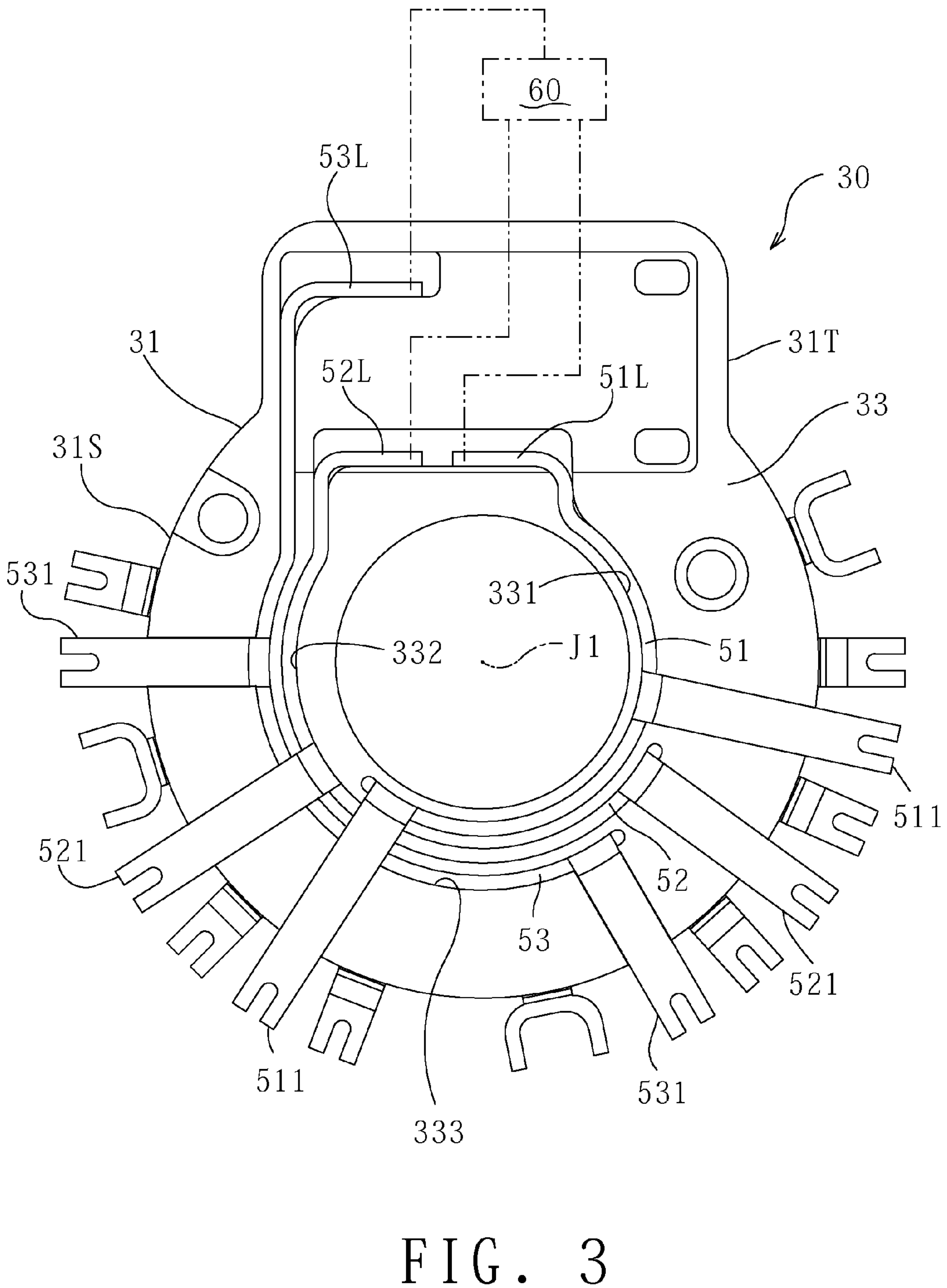
FIG. 3 is a plan view of the busbar unit according to the first preferred embodiment of the present invention.
Figure 4:
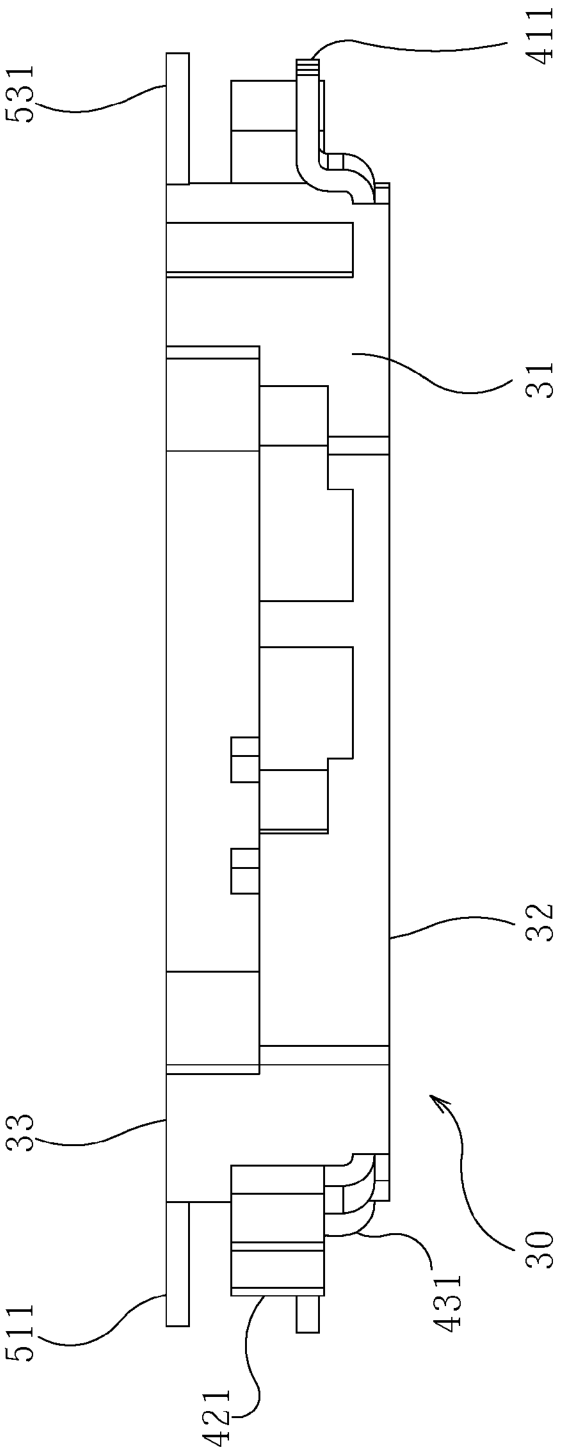
FIG. 4 is a side view of the busbar unit according to the first preferred embodiment of the present invention.

The structure of the busbar unit 30 of the present preferred embodiment will now be described in detail. FIG. 2 is a bottom view of the busbar unit 30, i.e., a view of the busbar unit 30 when viewed from the armature 12. FIGS. 3 and 4 are a plan view and a side view of the busbar unit 30, respectively. As is apparent from those figures, the busbar unit 30 is approximately circular in a plan view. The busbar unit 30 has a function of supplying the current to the coil windings of the armature 12.

As shown in FIGS. 2 and 3, the busbar unit 30 includes a busbar holder 31 and busbars 41, 42, 43, 51, 52, 53 attached thereto. The busbar holder 31 is opposed to and arranged above the armature 12 in the axial direction and supports the busbars 41, 42, 43, 51, 52, 53. The busbar holder 31 is made of insulating material and the busbars 41, 42, 43, 51, 52, 53 are made of an electrically-conductive material. The busbar holder 31 has a first surface 32 and a second surface 33 on opposite sides thereof in the axial direction. The busbar holder 31 includes a holder body 31S and a projection 31T projecting from the holder body 31S. The holder body 31S is approximately circular when viewed along the center axis J1. The projection 31T extends from the holder body 31S outward in a radial direction perpendicular or substantially perpendicular to the center axis J1.

Referring to FIG. 2, the first surface 32 of the busbar holder 31, which is a bottom surface in the present preferred embodiment, is provided with grooves 321, 322, and 323 therein. The grooves 321, 322, and 323 preferably are approximately circularly arcuate shaped when the bottom portion 32 is viewed along the center axis J1. Moreover, referring to FIG. 3, the second surface 33 of the busbar holder 31, which is a top surface in the present preferred embodiment, is provided with grooves 331, 332, and 333 therein. The grooves 331, 332, and 333 are approximately circularly arcuate shaped when viewed along the center axis J1.

Figure 5:
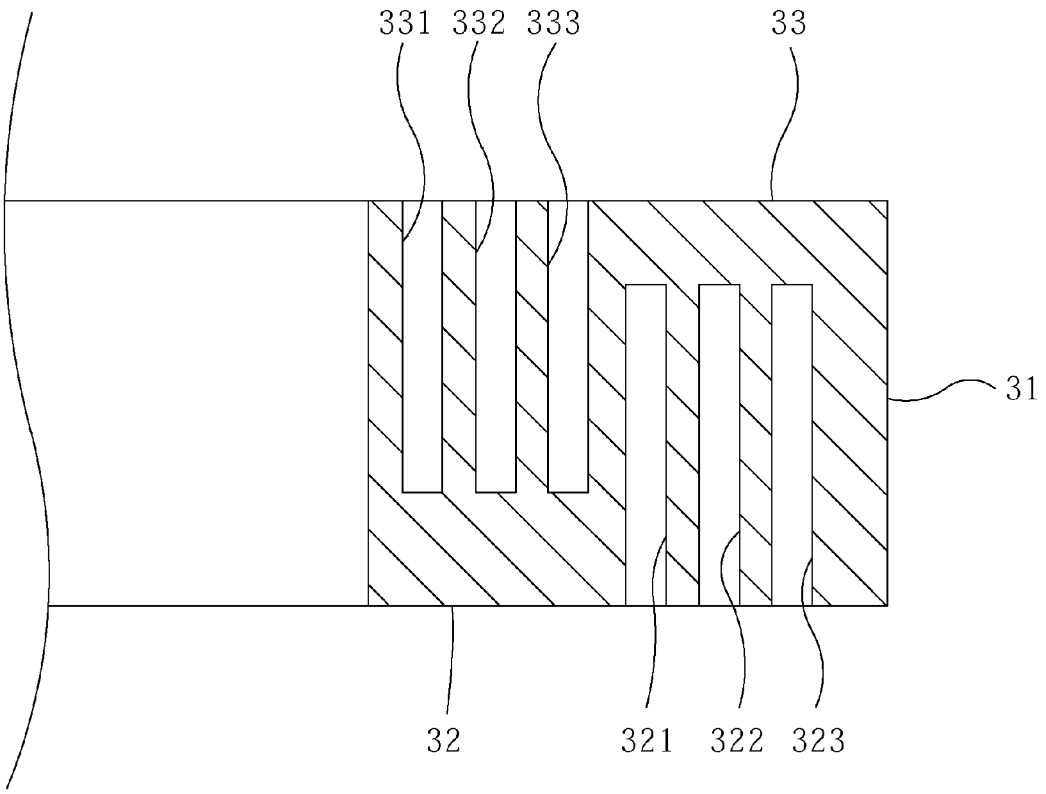
FIG. 5 is a cross-sectional view of the busbar unit, taken along line B-B in FIG. 2.

FIG. 5 is a cross-sectional view of the busbar holder 31, taken along line B-B in FIG. 2. As shown in FIG. 5, the grooves 321, 322, and 323 overlap the grooves 331, 332, and 333 in the radial direction. More specifically, the grooves 331, 322, and 323 are arranged in a radially inner portion of the busbar holder 31, while the grooves 321, 322, and 323 are arranged in a radially outer portion thereof. With this arrangement of the grooves 321, 322, and 323 and the grooves 331, 332, and 333, the busbars 41, 42, and 43 and the busbars 51, 52, and 53 can be arranged at positions which overlap one another in the radial direction, thus reducing an axial dimension of the busbar unit 30.

Returning to FIG. 2, the busbars 41, 42, 43 are accommodated in the grooves 321, 322, and 323, respectively. The busbars 41, 42, and 43 are approximately circularly arcuate shaped in accordance with the shape of the grooves 321, 322, and 323. The busbar 41 is provided with three wire connector portions 411, 411, and 411; the busbar 42 is provided with three wire connector portions 421, 421, and 421; and the busbar 43 is provided with three wire connector portions 431, 431, and 431. Each of the wire connector portions 411, 421, and 431 projects from a corresponding busbar. To the wire connector portions are connected the conductive wires forming the coil windings of the armature 12.

Referring to FIG. 4, the wire connector portions 411, 421, and 431 project from the corresponding busbars 41, 42, and 43 outward in the radial direction and are then bent upward, i.e., bent away from the armature 12. The bending of the wire connector portions 411, 421, and 431 can ensure an appropriate insulation distance between the wire connector portions 411, 421, and 431 and the coil windings.

Referring to FIG. 3, the busbars 51, 52, and 53 are accommodated in the grooves 331, 332, and 333 on the second surface 33 of the busbar holder 31, respectively. The busbars 51, 52, and 53 are approximately circularly arcuate shaped in accordance with the shape of the grooves 331, 332, and 333. The busbars 51, 52, and 53 are arranged so that portions thereof are arranged on the projection 31T of the busbar holder 31. Those portions serve as relay connector portions 51L, 52L, and 53L.

The busbar 51 is provided with two wire connector portions 511 and 511; the busbar 52 is provided with two wire connector portions 521 and 521; and the busbar 53 is provided with two wire connector portions 531 and 531. To the wire connector portions 511, 521, and 531 are connected ends of conductive wires forming the coil windings of the armature 12.

Figure 6:
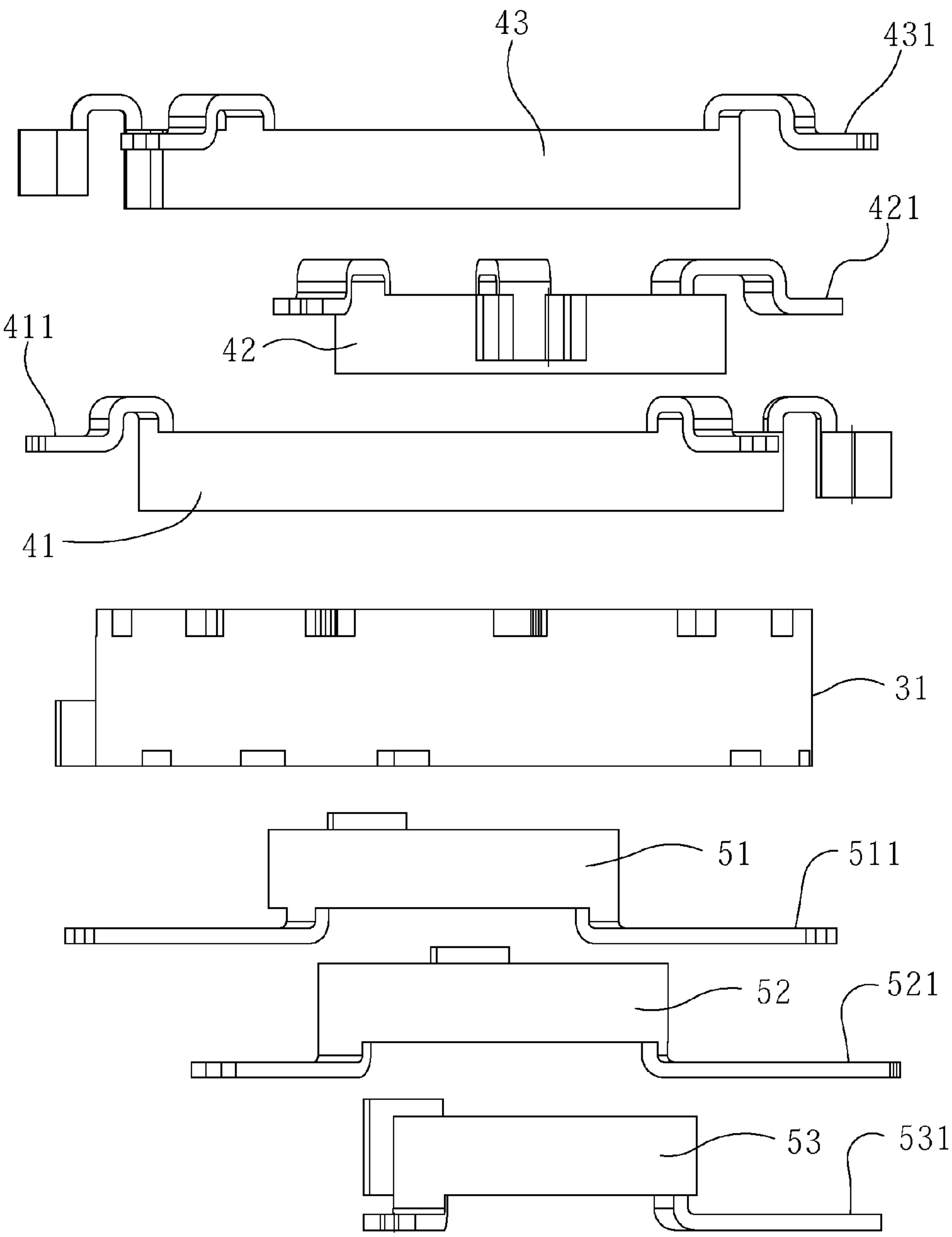
FIG. 6 is an exploded side view of the busbar unit according to the first preferred embodiment of the present invention.
Figure 7:
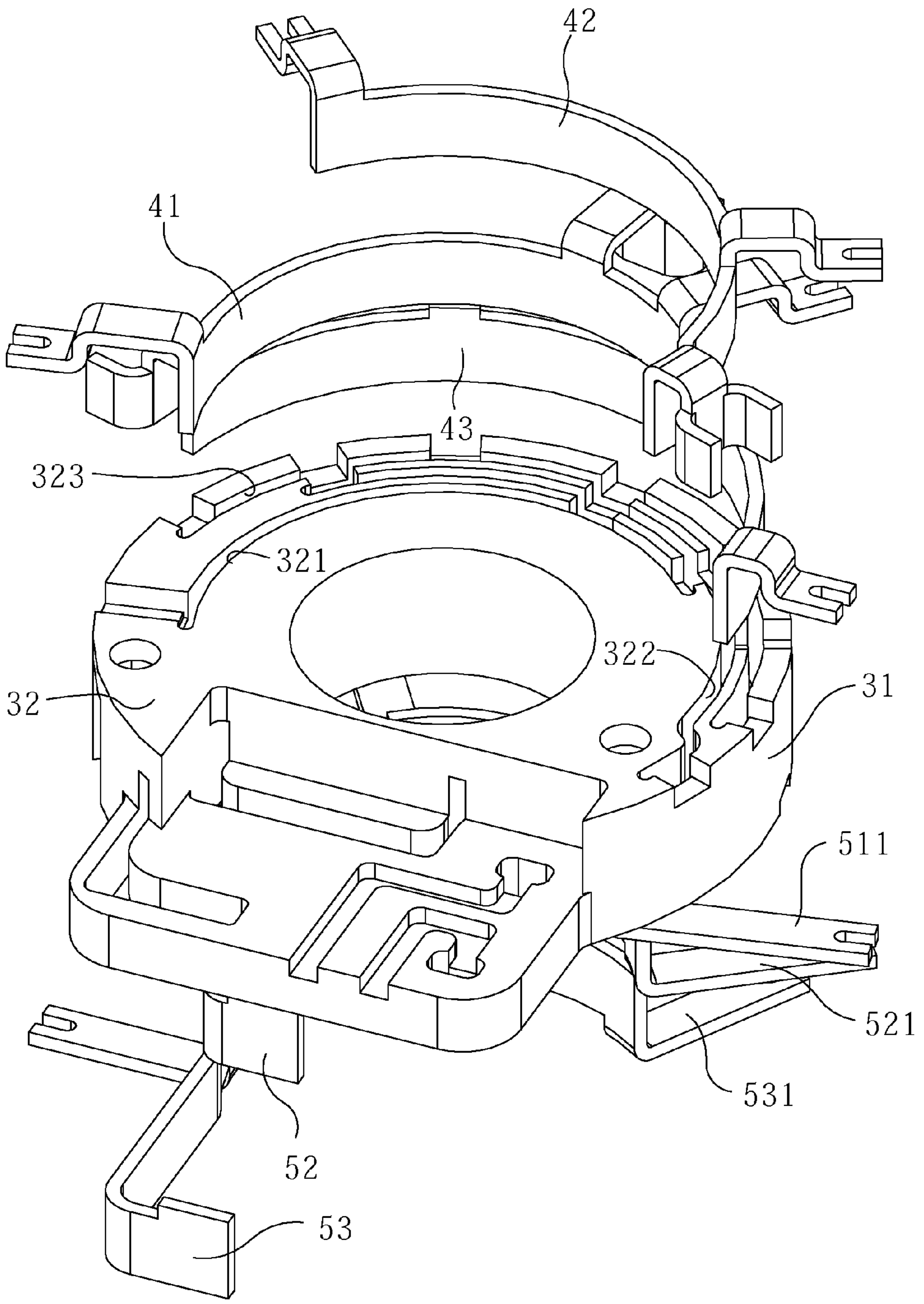
FIG. 7 is an exploded perspective view of the busbar unit according to the first preferred embodiment of the present invention.

FIG. 6 is a side exploded view of the busbar holder 31 and the busbars 41, 42, 43, 51, 52, and 53. FIG. 7 is a perspective view thereof. Please note that the components in FIGS. 6 and 7 are upside down with respect to FIG. 1. In other words, the armature 12 is arranged above the components shown in FIGS. 6 and 7.

The thus configured busbar holder 31 is connected to a power supply via a control unit such as an ECU. In the present preferred embodiment, the busbar holder 31 is connected to a vehicle's battery. Each of the busbars 41, 42, and 43 corresponds to any of a U-phase, a V-phase, and a W-phase of a three-phase power supply. To the wire connector portions 411, 421, and 431, conductive wires forming the coil windings of the armature 12 are connected, respectively. With this configuration, a three-phase current is supplied to the respective coil windings of the armature 12 via the busbars 41, 42, and 43.

The conductive wires connected to the wire connector portions 411, 421, and 431 at their first ends are connected to the wire connector portions 511, 521, and 531 at their second ends.

Referring to FIG. 3, the relay connector portions 51L, 52L, and 53L are connected to a relay 60. In this manner, a neutral point is provided via the relay 60.

As described above, in the busbar unit 30 of the present preferred embodiment, the busbars 41, 42, and 43 are arranged on the first surface 32 of the busbar holder 31 and the busbars 51, 52, and 53 are arranged on the second surface 33. To the wire connector portions 411, 421, and 431 of the busbars 41, 42, and 43 and the wire connector portions 511, 521, and 531 of the busbars 51, 52, and 53 are connected the conductive wires forming the coil windings. That is, the wire connector portions 411, 421, 431, 511, 521, and 531 are distributed on both surfaces of the busbar unit 30. With this configuration, a distance between adjacent wire connector portions can be increased, as compared with an arrangement in which all the wire connector portions are arranged on one surface of the busbar unit. The increase in the distance between adjacent wire connector portions can make it easier to connect the conductive wires forming the coil windings and the busbar unit 30 to each other. In addition, the wire connector portions can be more surely electrically insulated from each other.

Moreover, when electromagnetic locking occurs because of a failure of a switching device or the like, the rotor is locked.

In this case, control is performed to turn off the relay 60 and disconnect the neutral point in the present preferred embodiment. Thus, current supply to the armature 12 is stopped, preventing the rotor from being locked. Accordingly, even if a failure occurs, the driver can steer the vehicle.

Furthermore, the grooves 331, 332, and 333 arranged in the radially inner portion of the busbar holder 31 accommodate the neutral-point side busbars 51, 52, and 53, as shown in FIG. 3. Thus, it is possible to easily connect the neutral-point side busbars 51, 52, and 53 and the relay 60 to each other. In other words, since the radially inner busbars are used as the neutral-point side busbars, a distance of those busbars from the relay 60 can be reduced and wiring can be easily provided although the relay 60 is accommodated in the projection 31T.

Second Preferred Embodiment

Figure 8:
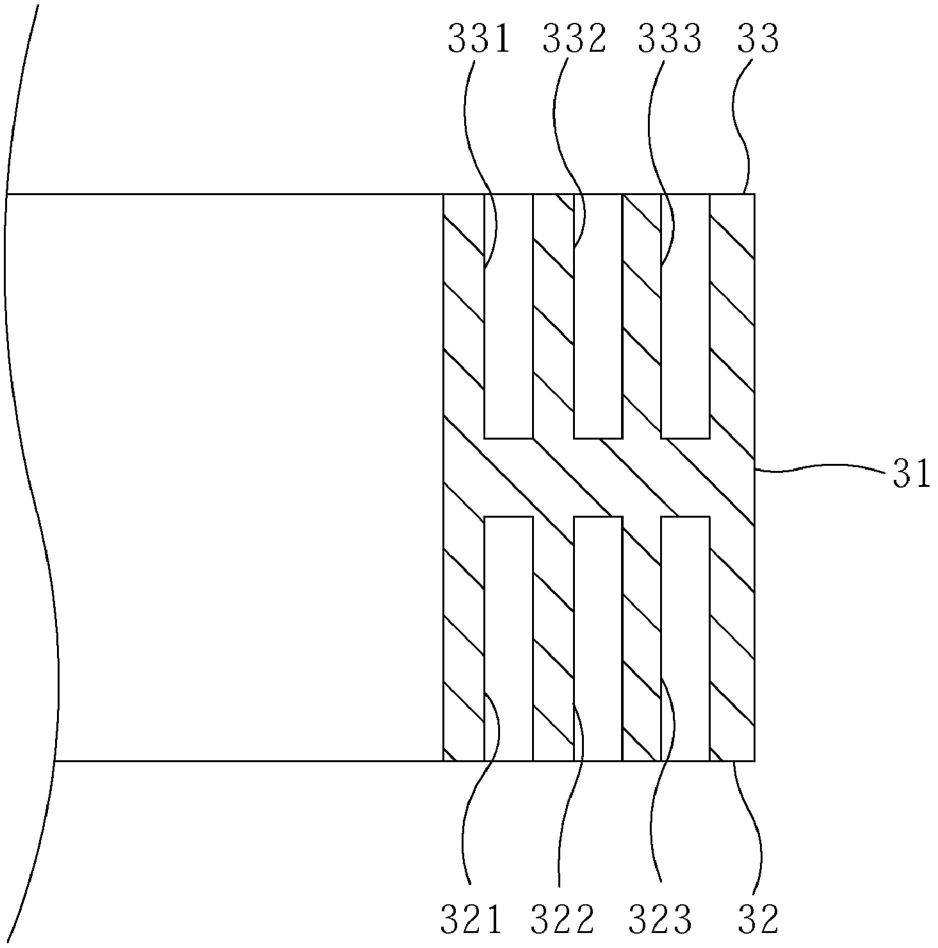
FIG. 8 is a cross-sectional view of a busbar holder according to a second preferred embodiment of the present invention.

A second preferred embodiment of the present invention will now be described. FIG. 8 is a cross-sectional view of a busbar holder 31*a* having a first surface 32*a* and a second surface 33*a* according to the second preferred embodiment of the present invention. Although the grooves 321, 322, and 323 overlap the grooves 331, 332, and 333 in the radial direction in the first preferred embodiment as shown in FIG. 5, the grooves 321, 322, and 323 overlap the grooves 331, 332, and 333 in an axial direction parallel to or substantially parallel to the center axis J1 in a busbar holder 31*a* of the present preferred embodiment, as shown in FIG. 8. This groove arrangement allows the busbars 41, 42, and 43 and the busbars 51, 52, and 53 to overlap each other in the axial direction, thus reducing the radial dimension of the busbar unit 30.

As described above, the busbar unit 30 of the first preferred embodiment can reduce the axial dimension thereof, while the busbar unit 30 of the present preferred embodiment can reduce the radial dimension thereof. Therefore, the required axial and/or radial dimension of the busbar unit 30 can be first determined in accordance with the structure of the brushless motor, and then the type of the busbar unit which can provide the determined dimension can be selected.

Third Preferred Embodiment

Figure 9:
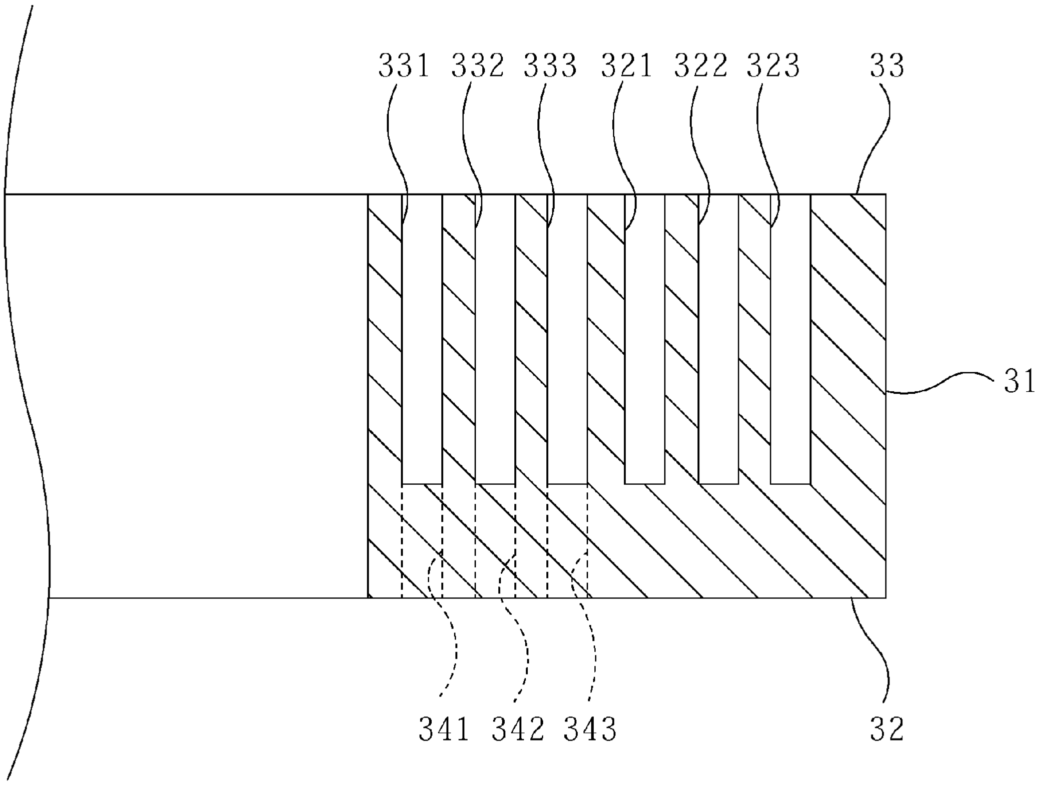
FIG. 9 is a cross-sectional view of a busbar holder according to a third preferred embodiment of the present invention.

FIG. 9 is a cross-sectional view of a busbar holder 31*b* according to a third preferred embodiment of the present invention. In the first preferred embodiment described with reference to FIG. 5, grooves are provided on both surfaces of the busbar holder 31 and each groove accommodates a busbar therein. On the other hand, in the busbar holder 31*b* of the third preferred embodiment shown in FIG. 9, grooves 321*b*, 322*b*, and 323*b* and grooves 331*b*, 332*b*, and 333*b* are provided on one of the surfaces of the busbar holder. In the shown example, the grooves are provided in the second surface 33*b*. However, the grooves may be provided in the first surface 32*b*.

The grooves 331*b*, 332*b*, and 333*b* are approximately circularly arcuate shaped and extend to the first surface 32*b* and to define communication holes 341, 342, and 343, respectively.

In the busbar holder 31*b* of the present preferred embodiment, the wire connector portions of the busbars accommodated in the grooves 321*b*, 322*b*, and 323*b* are provided on the second surface 33*b* as in the first and second preferred embodiments. However, the busbars accommodated in the grooves 331*b*, 332*b*, and 333*b* extend to the first surface 32*b* through the communication holes 341, 442, and 343 wherein the wire connector portions are provided on the first surface 32*b*.

Figure 10:
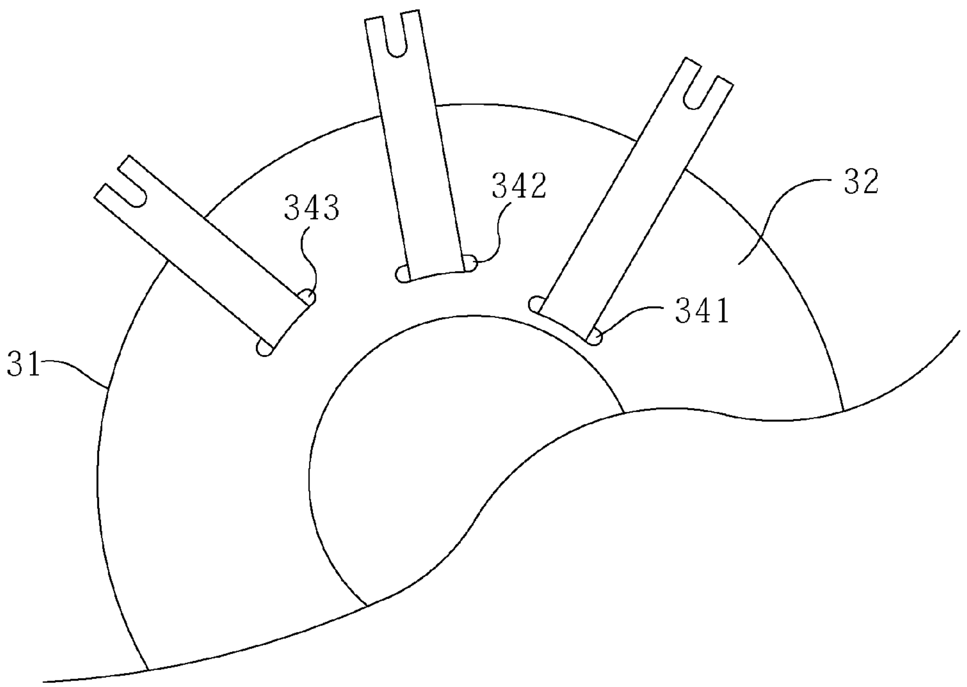
FIG. 10 is a bottom view of the busbar holder according to the third preferred embodiment of the present invention.

FIG. 10 shows the first surface 32*b* of the busbar holder 31*b* of the present preferred embodiment, with the busbars accommodated therein. As shown in FIG. 10, the communication holes 341, 342, and 343 are open at the first surface 32*b*, and the wire connector portions extending from the busbars accommodated in the second surface 33*b* project from the first surface 32*b* through the communication holes 341, 342, and 343.

In this configuration, the wire connector portions can be distributed on both surfaces, i.e., the first and second surfaces 32*b* and 33*b* of the busbar unit. Therefore, the distance between adjacent wire connector portions can be ensured, thus making connection of the conductive wires to the wire connector portions easier.

Fourth Preferred Embodiment

In the first, second, and third preferred embodiments described above, the busbars are accommodated in the grooves which are provided in the busbar holder 31. Alternatively, the busbar holder 31 made of an insulating material and the busbars made of an electrically conductive material can be formed integrally with each other by insertion molding.

For example, insertion molding may be performed for only one surface of the busbar holder 31, 31*a*, or 31*b*. More specifically, the grooves for accommodating the busbars are provided in only one of the surfaces of the busbar holder 31, 31*a*, or 31*b* so as to accommodate the busbars therein. On the other hand, the other surface, e.g., the surface opposed to the armature 12, is integrally molded with the busbars by insertion molding. The busbars accommodated in the grooves on the one surface form wire connector portions on the one surface. Similarly, the busbars integrally molded with the other surface form the wire connector portions on the other surface. With this configuration, it is also possible to distribute the wire connector portions on both surfaces of the busbar unit 30. Therefore, the distance between adjacent wire connector portions can be ensured, making connection of the conductive wires to the wire connector portions easier.

Alternatively, the surfaces of the busbar holder 31, 31*a*, or 31*b* and the busbars may be molded integrally with each other by insertion molding. In this case, the busbars having insertion-molded surfaces form the wire connector portions on that surface. With this configuration, it is also possible to distribute the wire connector portions on both surfaces of the busbar unit 30.

Figure 11:
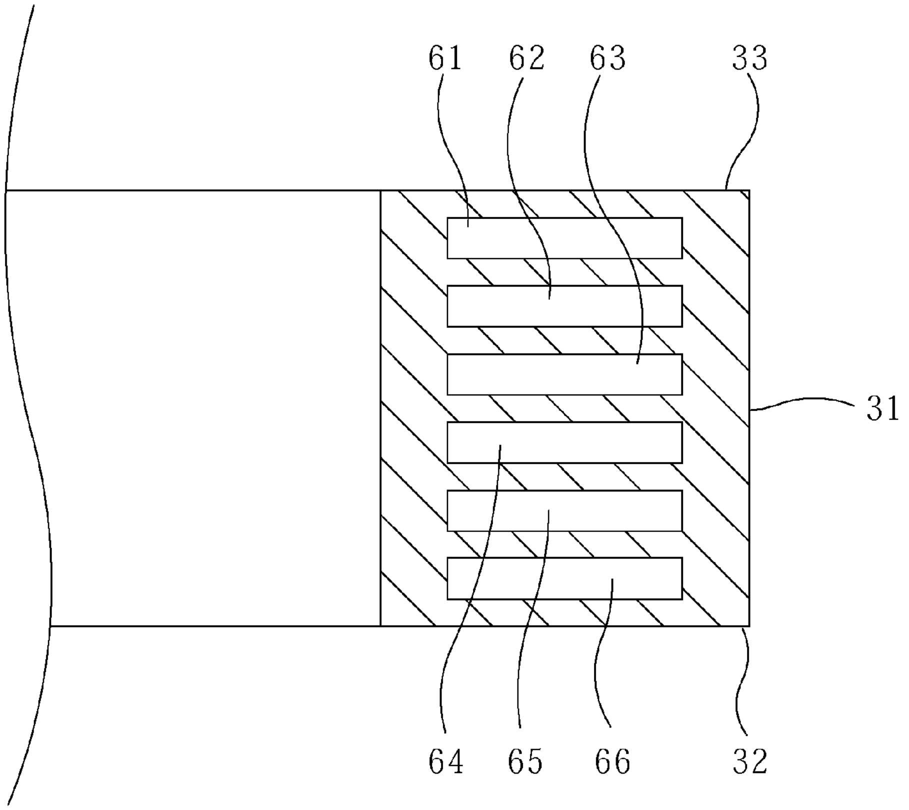
FIG. 11 is a cross-sectional view of a busbar holder according to a fourth preferred embodiment of the present invention.

Moreover, as shown in FIG. 11, a plurality of busbars 61, 62, 63, 64, 65, and 66 may be embedded in a busbar holder 31*c* by insertion molding. In this case, an electrically conductive member which is a portion of each of the embedded busbars 61, 62, 63, 64, 65, and 66 is arranged to extend from the corresponding busbar to the second surface 33*c* or the first surface 32*c*, thereby forming a wire connector portion. Also in this configuration, the wire connector portions can be distributed on both the first and second surfaces 32*c* and 33*c*.

Figure 12:
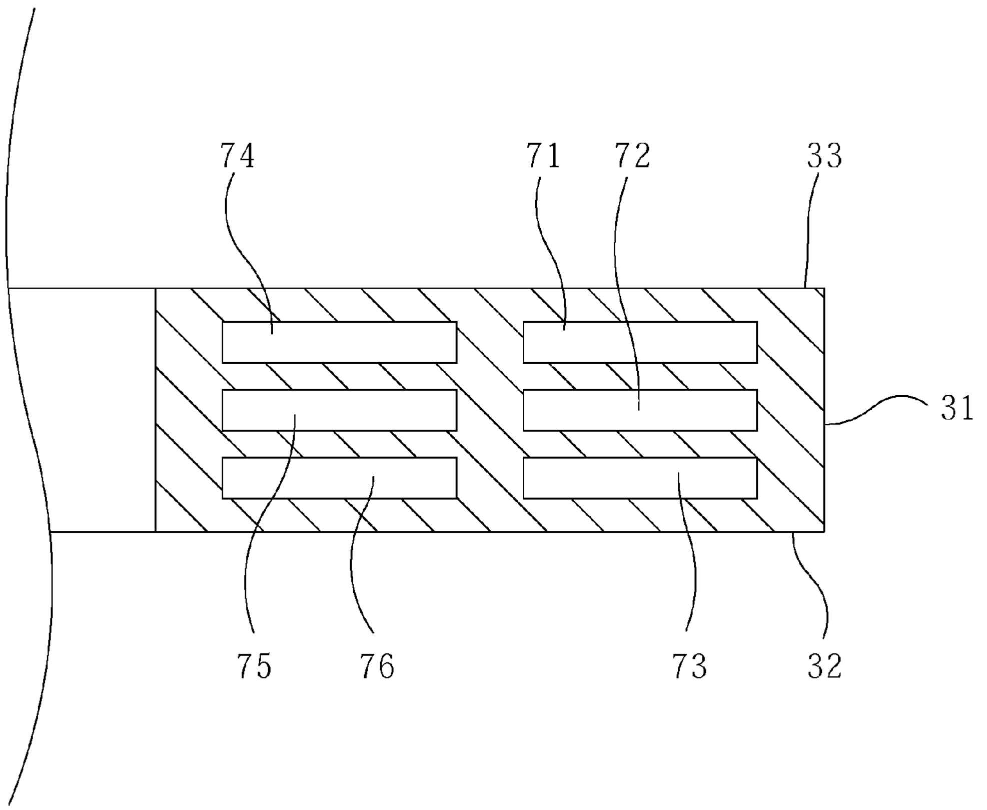
FIG. 12 is a cross-sectional view of another busbar holder according to the fourth preferred embodiment of the present invention.

In the example of FIG. 11, the busbars 61, 62, 63, 64, 65, and 66 are arranged in the axial direction. Alternatively, as shown in FIG. 12, two busbar groups are arranged in the radial direction, in each of which busbars 71, 72, and 73 or busbars 74, 75, and 76 are arranged in the axial direction. The busbars 71, 72, 73, 74, 75, and 76 are also embedded in a busbar holder 31*d*. In this case, an electrically conductive member as a portion of each of the embedded busbars 71, 72, 73, 74, 75, and 76 extends from the corresponding busbar to the second surface 33*d* or the first surface 32*d*, thereby forming a wire connector portion. With this configuration, it is also possible to distribute the wire connector portions on both the first and second surfaces 32*d* and 33*d*.

In the aforementioned preferred embodiments, both the number of the busbars provided to correspond to the respective phases and the number of the neutral point side busbars preferably are three. However, the number of the busbars and/or the number of the wire connector portions can be changed based on the numbers of the phases and the slots of the brushless motor. In accordance with that change, the number of the grooves provided in the busbar holder 31, 31*a*, 31*b*, 31*c*, or 31*d* can be also changed. Moreover, the shape of the wire connector portions may be changed appropriately.

In the aforementioned preferred embodiments, the relay is provided in the busbar unit. However, the relay may be accommodated in a control unit. In this case, the neutral point side busbars which are to be connected to the relay are electrically connected to the control unit, like the busbars provided for the respective phases.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A busbar unit for use with a motor including an armature that has a plurality of teeth and a plurality of coil windings respectively arranged around the teeth, the busbar unit comprising:

a plurality of busbars each having a wire connector portion arranged to be connected to a conductive wire extending from a corresponding coil winding of the motor; and a busbar holder opposed to and arranged above the armature of the motor in an axial direction parallel to or substantially parallel to a center axis of the motor, the busbar holder having axially opposed top and bottom surfaces, made of an insulating material, and arranged to support at least one of the busbars on the top surface and at least one of the busbars on the bottom surface; wherein at least one of the wire connector portions is arranged on the top surface of the busbar holder and at least one of the wire connecting portions is arranged on the bottom surface of the busbar holder.

2. The busbar unit according to claim 1, wherein the busbar holder is provided with grooves arranged to accommodate the busbars, the grooves being provided on both of the top and bottom surfaces.

3. The busbar unit according to claim 1, wherein the busbar holder is provided with grooves arranged to accommodate the busbars on only the top surface, and the bottom surface is provided with communication holes in communication with the grooves; and at least one of the busbars accommodated in the grooves extends through a corresponding one of the communication holes to the bottom surface of the busbar holder to define a corresponding one of the wire connector portions.

4. The busbar unit according to claim 1, wherein the busbar holder is provided with at least one groove arranged to accommodate a corresponding one of the busbars therein on the top surface of the busbar holder, and the busbar holder is integrally molded with the remaining busbars of the plurality of busbars.

5. The busbar unit according to claim 1, wherein the busbar holder and the busbars are integrally molded with each other.

6. The busbar unit according to claim 1, further comprising a relay arranged to break a driving current supplied to the armature and connected to two or more of the busbars, the two or more busbars arranged to be connected to a neutral point side of the coil windings.

7. The busbar unit according to claim 6, wherein at least two of the busbars overlap in a radial direction of the busbar holder, and the busbars arranged to be connected to the neutral point side of the coil windings are arranged in a radially inner portion of the busbar holder.

8. The busbar unit according to claim 1, wherein at least two of the busbars overlap in a radial direction of the busbar holder.

9. The busbar unit according to claim 1, wherein at least two of the busbars overlap in the axial direction of the busbar holder.

10. A motor comprising the busbar unit according to claim 1.

11. The motor according to claim 10, wherein the motor is arranged to assist a driver in steering a vehicle.

12. A busbar unit for use with a motor including an armature that has a plurality of teeth and a plurality of coil windings respectively arranged around the teeth, the busbar unit comprising:

a plurality of busbars each having a wire connector portion arranged to be connected to a conductive wire extending from a corresponding coil winding of the motor; and a busbar holder opposed to and arranged above the armature of the motor in an axial direction parallel or substantially parallel to a center axis of the motor, the busbar holder arranged to support the busbars, and having axially opposed top and bottom surfaces made of an insulating material; wherein the busbar holder is provided with at least one groove arranged to accommodate a corresponding one of the busbars therein on the top surface of the busbar holder;

the bottom surface is provided with at least one communication hole in communication with the at least one groove;

at least one of the busbars, accommodated in the at least one groove, extends through a corresponding one of the at least one communication hole to the bottom surface of the busbar holder to define a corresponding one of the wire connector portions; and the busbar holder is integrally molded with the remaining busbars of the plurality of busbars.

13. The busbar unit according to claim 12, wherein the wire connector portions are spaced apart from one another in a circumferential direction around the busbar holder such that none of the wire connector portions overlaps another one of the wire connector portions in the axial direction.

* * * * *